Oct. 8, 1968   W. L. STACE ET AL   3,404,896
CHUCK
Filed Aug. 11, 1966   4 Sheets-Sheet 4

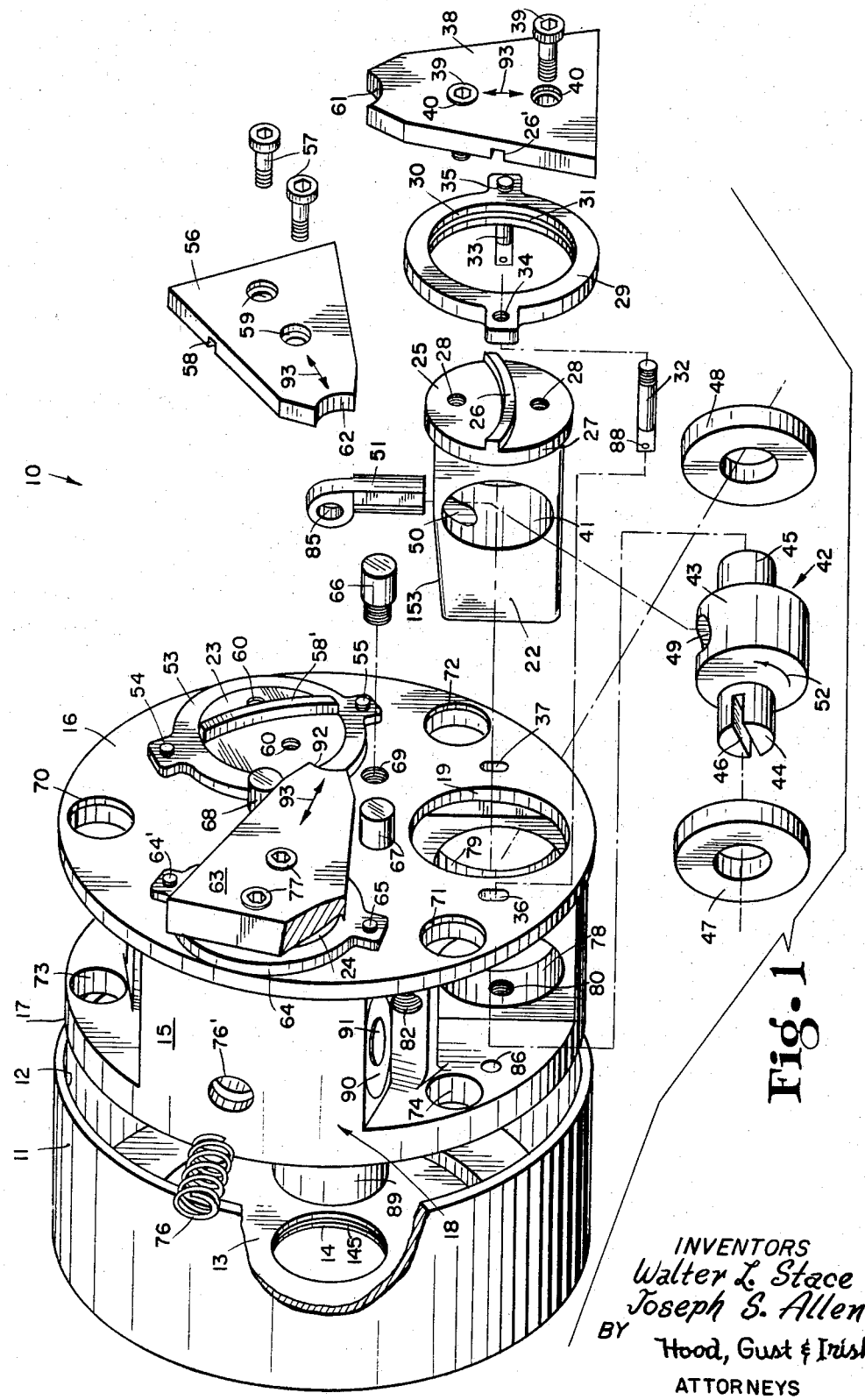

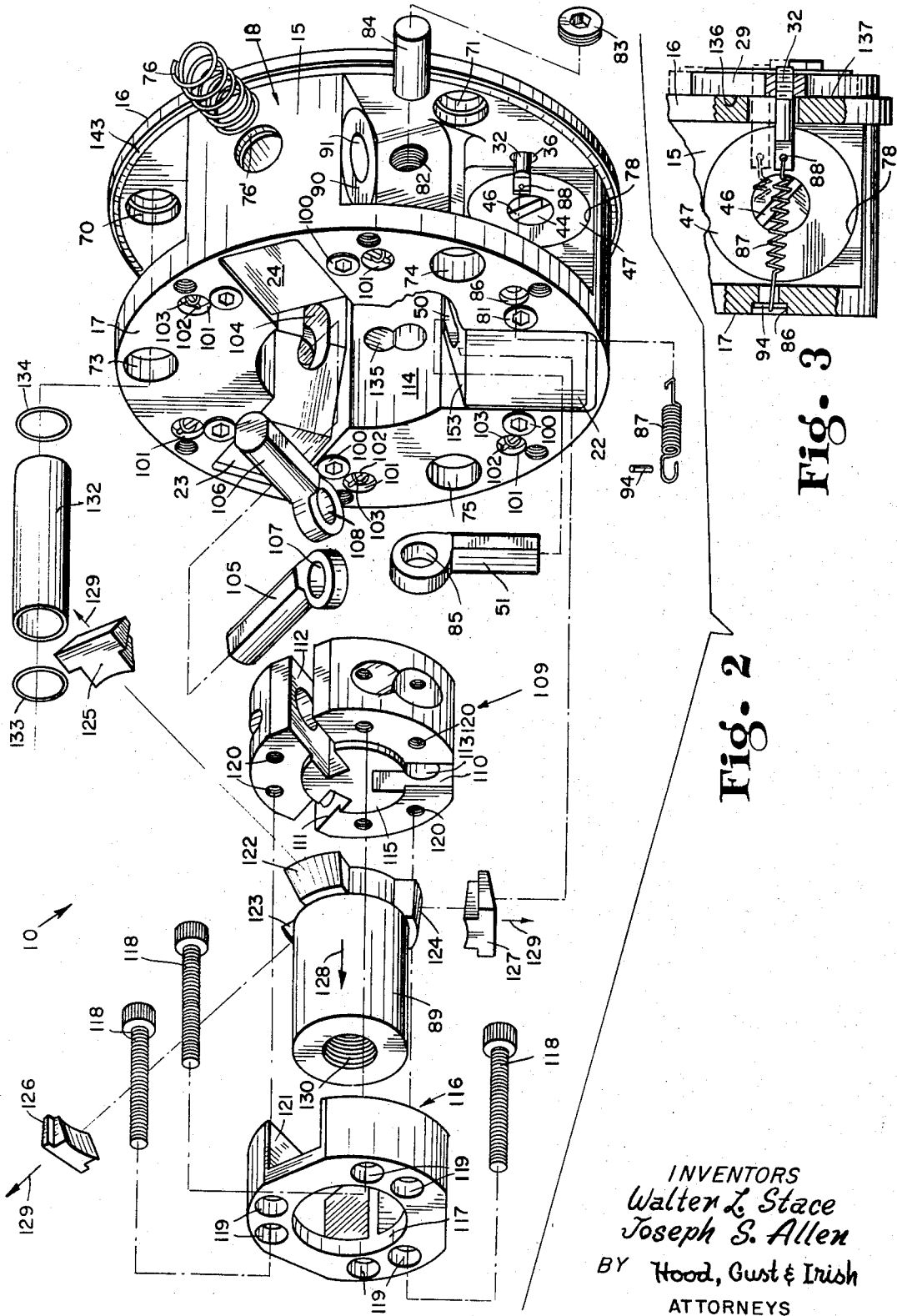

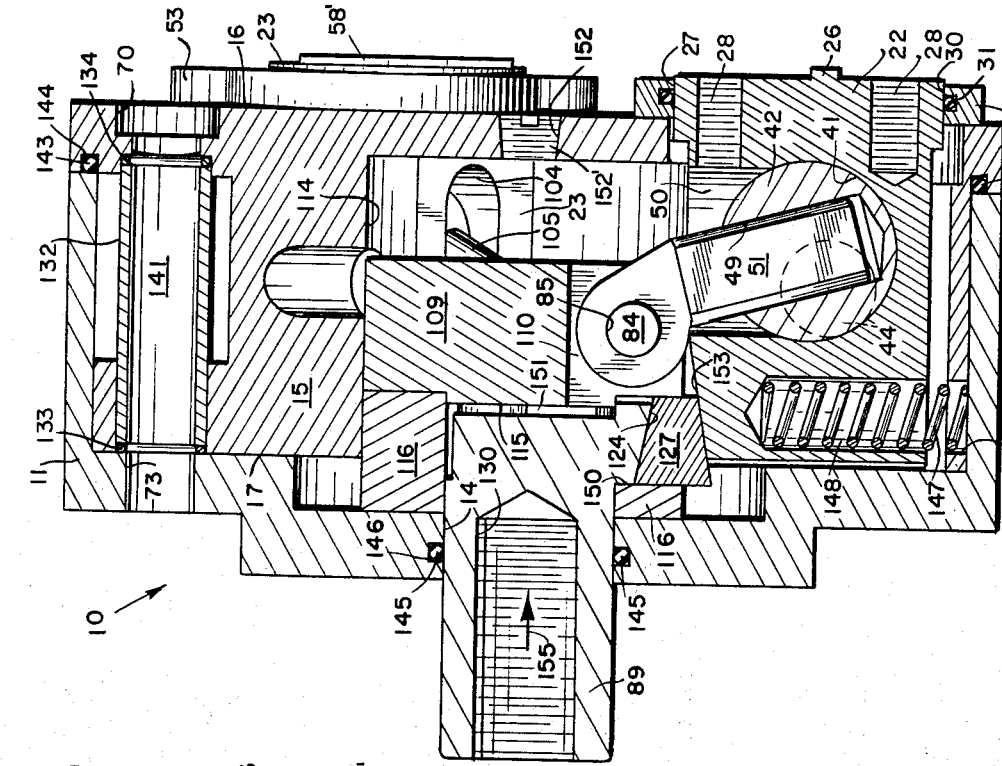
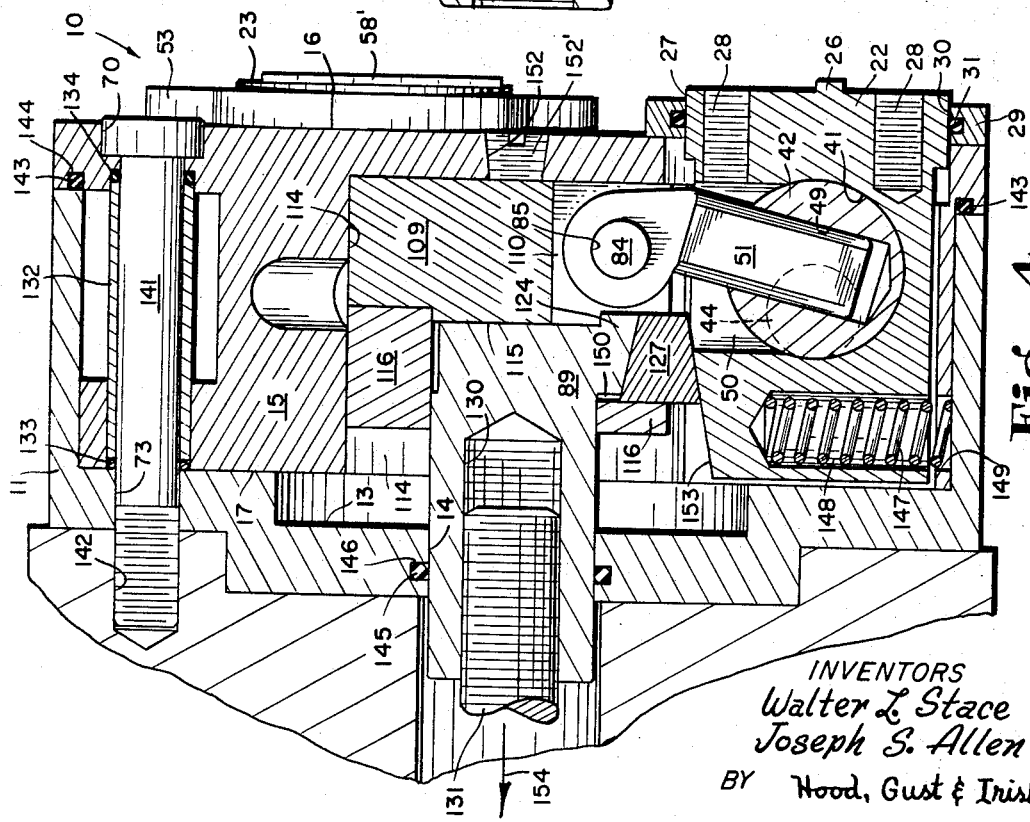

INVENTORS
Walter L. Stace
Joseph S. Allen
BY Hood Gust & Irish
ATTORNEYS

United States Patent Office 3,404,896
Patented Oct. 8, 1968

3,404,896
CHUCK
Walter L. Stace and Joseph S. Allen, both of 2250 W.
Minnesota St., Indianapolis, Ind. 46221
Filed Aug. 11, 1966, Ser. No. 571,910
16 Claims. (Cl. 279—2)

The present invention relates to chucks, and particularly to that type of chuck having a plurality of radially movable, work engaging jaw members; and has, as its primary object, the provision of an improved means for effecting radial movement of said jaw members into and out of engagement with a work piece.

It is another object of the present invention to provide such a chuck in which the jaw members are moved by a cam follower means and are locked in a work-gripping position by a wedge means cooperating with the cam follower means.

It is still another object of the present invention to provide such a chuck in which the jaw members are moved axially by a cam follower means so as to grip the work loaded into said chuck and pull it toward the face thereof.

It is a further object of the present invention to provide such a chuck in which the movement of the jaw members is made smoother and more accurate by a wedge means cooperating with a cam follower means, the wedge means being carried preferably by a reciprocating means which is linked to a cam means cooperating with the cam follower means.

Further objects of the present invention will become apparent as the description proceeds.

To the accomplishment of the above and related objects, the present invention may be embodied in the forms illustrated in the accompanying drawings, attention being called to the fact, however, that the drawings are illustrative only, and that change may be made in the specific constructions illustrated and described, so long as the scope of appended claims is not violated.

FIG. 1 is an exploded perspective view of one embodiment of the chuck of the present invention illustrating the face portion which receives the work;

FIG. 2 is an exploded perspective view of the embodiment of FIG. 1 illustrating the end which is mounted to the supporting equipment;

FIG. 3 is a fragmentary side view of the embodiment of FIG. 1 showing the cooperation of sealing members and the face plate of the chuck;

FIG. 4 is a side sectional view of the embodiment of FIG. 1 showing the position of the chuck elements when the jaw members are in their radially-outward positions;

FIG. 5 is a side sectional view of the embodiment of FIG. 1 showing the position of the chuck elements when the jaw members are in their radially-inward positions;

Figure 7:
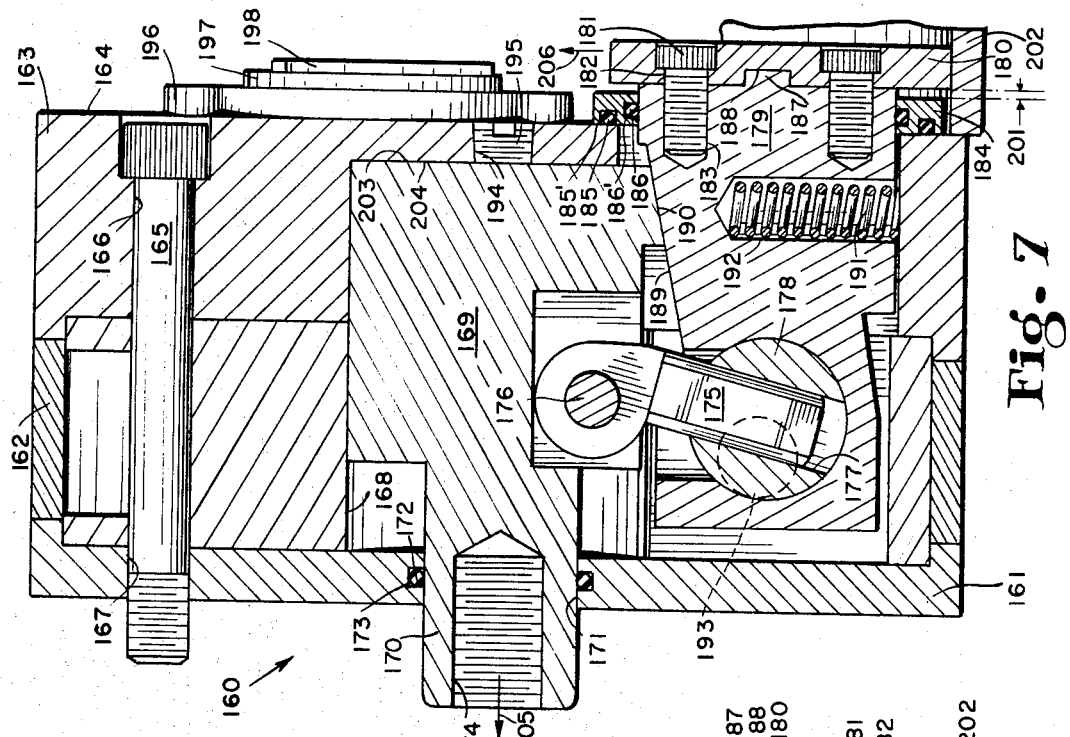
FIG. 7 is a side sectional view of the chuck of FIG. 6 showing the position of the chuck elements when the jaw members are in their radially-outward positions.

Generally speaking, the present invention resides in a chuck of the type including a base structure and a plurality of jaw members radially arranged about an axis of the base structure and adapted for radial movement relatively to the axis. Specifically, the invention is a means for simultaneously operating the jaw members. There is a cam follower means supporting each of the jaw members and a cam means cooperating with each of the cam follower means. The cam means are rotatably supported in the base structure and are rotated by a linkage means. The linkage means is pivotally connected to a reciprocating means which is disposed in a cavity which is substantially on the axis of the base structure. There is a wedge means disposed on the reciprocating means so as to pivot the cam follower means about the cam means, thereby locking the jaw members in a closed position. A power actuated plunger is connected to the reciprocating means so as to impart movement thereto. A resilient means is provided for opposing the force applied by the wedge means against the cam follower means.

In a specific embodiment of the present invention, the aforementioned reciprocating means comprises a pivot block, a draw bar, means connecting the draw bar to the pivot block so as to permit a predetermined relative movement therebetween, and the aforementioned wedge means. The wedge means is arranged to pivot the cam follower means about the cam means when the draw bar moves away from the pivot block and to release the cam follower means when the draw bar moves toward the pivot block.

Referring now to the drawings, and particularly the exploded perspective view of FIG. 1, the component parts of an illustrative embodiment of the present invention can be visualized in conjunction with the following description.

One embodiment of the chuck of the present invention is indicated generally by the reference number 10. A housing 11 is provided for the chuck 10. It can be seen that the housing 11 is a cylindrically shaped housing having an open end 12 for receiving a base structure 15 of the chuck 10 and a closed end 13. The closed end 13 has a centrally located hole 14 therein for receiving a draw bar 89, not shown in FIG. 1.

The base structure 15, has a substantially flat face portion 16, back portion 17, and central portion indicated generally as 18. There are three equally and radially spaced holes 19 in the face portion, only one of which is clearly to be seen in FIG. 1. There is a cam follower means, hereinafter referred to as the cam follower member 22, disposed in the illustrated hole 19 so as to extend into the central portion 18 of the base structure 15. Similar cam follower means, hereinafter referred to as cam follower members 23 and 24, are similarly disposed in the other two such holes.

The cam follower member 22 has a circular face portion 25 extending through the face portion 16. The face portion 25 has an arcuately shaped key 26 integrally formed thereon, a cylindrical side wall 27 and a pair of threaded holes 28. There is a sealing 29 having an inner diameter 30 with an O-ring 31 disposed therein as shown. The inner diameter 30 is adapted to fit over the side wall 27 so as to form a seal therebetween.

There are a pair of standoffs 32 and 33 threaded into holes 34 and 35 in the sealing ring 29. The standoffs 32 and 33 extend through a pair of holes 36 and 37 in the face portion 16. The function of the standoffs 32 and 33 and the sealing ring 29 will be discussed in conjunction with FIG. 3.

A jaw member 38 is fastened to the face portion 25 by means of a pair of screws 39 which thread into the holes 28. Countersunk holes 40 are provided in the jaw member 38 for receiving the screws 39 and a keyway 26′ is provided for receiving the key 26. The jaw member 38 is also provided with a cut-out portion 61 for gripping a portion of the work loaded into the chuck 10.

The cam follower member 22 is provided with a cylindrical opening 41 extending perpendicularly to the axis of the circular face portion 25. A cam, indicated generally by the reference number 42, is adapted to rotatably fit in the hole 41. The cam 42 has a cylindrical camming surface 43 and a pair of shafts 44 and 45 eccentrically disposed with respect to the camming surface 43. The shaft 44 is provided with a slot 46 which permits manual rotation of the cam 42 during assembly. There are a pair of bearings 47 and 48 for rotatably supporting the shafts 44 and 45 respectively.

There is a transaxial 49 disposed in the cam 42 and a corresponding hole 50 in the cam follower 22. A linkage means, hereinafter referred to as a cam actuator arm 51, for rocking the cam 42 in the bearings 47 and 48 is disposed so as to extend through the hole 50 and into the hole 49. The hole 50 is elongated so as to permit the cam actuator arm 51 to be moved to rotate the cam 42 in the direction of the arrow 52.

The cam actuator arm 51 and its function will be described further in conjunction with FIGS. 2, 4 and 5.

The cam follower member 23 is shown assembled into another of the holes 19 in the face portion 16. There is a sealing ring 53, which is similar to the sealing ring 29, disposed about the cam follower 23. The sealing ring 53 is held against the face portion 16 by means of a pair of standoffs 54 and 55 in a manner shown in FIG. 3.

A second jaw member 56 is fastened to the cam follower member 23 by means of a pair of screws 57 and a keyway 58. The screws 57 extend through countersunk holes 59 and thread into holes 60. The keyway 58 is adapted to receive a key 58' which is integrally formed on the cam follower member 23. The jaw member 56 is also provided with a cut-out portion 62 for gripping a portion of the work loaded into the chuck 10.

A third jaw member 63 is shown assembled to the cam follower member 24, which is received in the third of the holes 19, in the same manner that jaw members 38 and 56 are assembled to their respective cam follower members. A sealing ring 64 similar to the sealing ring 29 is assembled about the cam follower 24 and is secured by the standoffs 64' and 65. A pair of screws 77 hold the jaw member 63 to the cam follower member 24. The jaw member 63 is also provided with a cut-out portion 92 for gripping the work loaded in the chuck 10.

There are three equally and radially spaced stop members 66, 67 and 68 fastened to the face portion 16 so as to be between the jaw members 38, 56 and 63. The work loaded into the chuck 10 is securely held against the stop members 66, 67 and 68 by the jaw members 38, 56 and 63. The stop member 66 is threaded into a hole 69 and the other two stop members 67 and 68 are threaded into similar holes. This arrangement provides a means for axially adjusting the position of the stop member 66, 67 and 68.

There are three equally and radially spaced countersunk holes 70, 71 and 72 in the face portion 16 and corresponding holes 73, 74 and 75 in the back portion for receiving mounting bolts, one of which is illustrated in FIG. 4. The hole 75 is not shown in FIG. 1.

There is a resilient means, hereinafter referred to as the helical spring 76 or spring 76, disposed in a hole 76' in the central portion 18 of the base structure 15. The function of the spring 76 will be discussed in conjunction with FIGS. 4 and 5.

There are a pair of holes 78 and 79 in the central portion 18 of the base structure 15 for receiving the bearings 47 and 48. There is a threaded hole 80 for receiving a set screw 81, not shown in FIG. 1, for holding the bearing 47 in position.

There is a threaded hole 82 for receiving a plug 83 after the bearing pin 84 for the cam actuator arm 51 is assembled therethrough. The plug 83 serves to contain a lubricant in the central portion of the chuck 10. The plug 83 and bearing pin 84 are shown in FIG. 2. The bearing pin 84 extends through the hole 85 in the end of the cam actuator arm 51. The function of the bearing pin 84 and cam actuator arm 51 will be shown clearly in FIGS. 2, 4 and 5.

There is a hole 86 for receiving a spring 87 connected to the standoff 32. In FIG. 3 it can be seen that the spring 87 extends through a small hole 88 in the end of the standoff 32. There is a pin 94 which holds the end of the spring 87 in the hole 86.

The back portion of a draw bar 89 extends from the back portion 17 of the base structure 15 through the hole 14 in the housing 11.

A bearing 90 like bearing 48 and shaft 91 like shaft 45 supported therein are shown in FIG. 1. The shaft 91 carries a cam like cam 42 for the cam follower member 24.

The jaw members 38, 56 and 63 are adapted to be moved in the direction of the arrows 93 shown thereon when the cam follower members 22, 23 and 24 are operated by their respective cams. The cut-out portions 61, 62 and 92 equally grip a portion of the work placed in the chuck 10 when the jaw members 38, 56 and 63 are closed.

Referring now to FIG. 2 an exploded perspective view of the back portion 17 of the base structure 15 and the elements disposed therein can be discussed.

Looking at the back portion 17 of the base structure 15, several components for mounting and securing the elements of the chuck 10 can be seen. There are set screws 100 for holding the bearings which support the shafts for the cams associated with the cam follower members 22, 23 and 24. There are also a plurality of holes 101 containing pins 102 for restraining springs 103 like spring 87. The springs 103 are associated with the standoffs 33, 54, 55, 64' and 65.

It can be seen that the cam follower member 23 has a hole 104 like the hole 50 for receiving a cam actuator arm 105. The cam actuator arm 105 extends into a hole in a cam, similar to the cam 42, associated with the cam follower member 23. There is a third cam actuator arm 106 adapted to rotate a cam, similar to the cam 42, associated with the cam follower member 24.

The cam actuator arm 105 has a hole 107 in the end thereof and the cam actuator arm 106 has a similar hole 108 in the end thereof. The cam actuator arms 51, 105 and 106 are disposed so as to be pivotally connected to a reciprocable pivot block indicated generally by the number 109. There are three equally and radially spaced cut-outs 110, 111 and 112 in the pivot block 109 for receiving the cam actuator arms 51, 105 and 106. The cam actuator arm 51 is disposed in the slot 110 and is held there by the pin 84 extending through the hole 85 in the cam actuator arm 51 and a hole 113 in the pivot block 109. The pin 84 is inserted in position through the hole 82 in the base structure 15. The cam actuator arm 105 is similarly held in the cutout 111 and the cam actuator arm 106 is similarly held in the cut-out 112.

The reciprocable pivot block 109 is slidably mounted in an axially extending hole or cavity 114 in the base structure 15. During assembly of the chuck 10, the cam actuator arms 51, 105 and 106 are placed in their respective cams, the pivot block 109 is placed in the cavity 114, and the cam actuator arms are pivotally connected to the pivot block 109 by pins such as the pin 84.

There is a concentric boss 115 on the back surface of the pivot block 109. The boss 115 faces the front portion of the draw bar 89 as illustrated in FIGS. 4 and 5.

The draw bar 89 is held concentrically with the pivot block 109 by a member 116. The member 116 has an axially located hole 117 for slidably receiving the shank portion of the draw bar 89. The member 116 is connected to the pivot block 109 by six screws 118 which extend through holes 119 in the member 116 and thread into holes 120 in the pivot block 109. The screws 118 also serve to secure the pins 84.

The draw bar 89 can move a predetermined distance with respect to the pivot block 109 and member 116 as shown in FIGS. 4 and 5. The member 116, therefore, is means for connecting the draw bar 89 to the pivot block 109 so as to permit a predetermined relative movement therebetween.

The member 116 has three equally and radially spaced cut-outs, similar to the cut-out 121 shown in FIG. 2, for receiving three equally and radially spaced wedges 122, 123 and 124 integrally formed on the end of the draw bar 89 adjacent to the pivot block 109. There are three floating wedges 125, 126 and 127 guided in the cut-outs and associated with the wedges 122, 123 and 124, respectively. It can be seen that the wedges 122, 123 and 124 and the wedges 125, 126 and 127 are disposed so that movement of the draw bar 89 in the direction of the arrow 128 (FIG. 2) moves the wedges 125, 126 and 127 radially outwardly in the direction of the arrows 129. Similarly, movement of the draw bar 89 in a direction opposite to the arrow 128 permits the wedges 125, 126 and 127 to move radially inwardly in a direction opposite to the arrows 129. The operation of the fixed wedges 122, 123 and 124 and the floating wedges 125, 126 and 127 will be further described in conjunction with FIGS. 4 and 5.

There is an axially located threaded hole 130 in the draw bar 89 for receiving the plunger 131 of a means (not shown) for moving the draw bar 89, pivot block 109 and member 116.

There is a sealing tube and a pair of O-rings, similar to the tube 132 and O-rings 133 and 134, for providing a sealed enclosure between the mounting holes 70, 71 and 72 on the face portion 16 and 73, 74 and 75 on the back portion 17.

There is an elongated hole 135 shown on the inside surface of the cavity 114. The hole 135 is a clearance hole created by the intersection of two holes similar to the hole 82 for permitting assembly of the bearing pin for the cam actuator arm 105.

Referring now to FIG. 3, a view illustrating the function of the sealing ring 29 can be discussed.

As explained above, the sealing ring 29 is spring loaded by means of the spring 87 against the face portion 16. It can be seen in FIG. 3 that the back surface 136 of the sealing ring 29 is tight against the front surface 137 of the face portion 16 so as to provide a seal therebetween. Therefore, when the cam follower member 22 moves radially, the sealing ring moves with it to provide a movable seal. An O-ring seal between the cam follower member 22 and the sealing ring 29 is illustrated in FIG. 1.

In FIG. 3, the dashed line drawing of the sealing ring 29, standoff 32 and spring 87 illustrates the relative movement of the sealing ring 29 when the chuck 10 is operated.

The sealing rings 29, 53 and 64 and the other sealing means illustrated in FIGS. 1 through 5 are required because the chuck 10 is filled with a lubricating fluid.

Referring now to FIGS. 4 and 5, sectional views showing cooperation among the various elements of the chuck 10 when the jaw members 38, 56 and 63 are open and closed and several elements not shown in previous views can be discussed.

There is a mounting bolt 141 extending through the holes 70 and 73 and the sealing tube 132 to thread into a hole 142 in the equipment upon which the chuck 10 is mounted. There is an O-ring 143 annularly disposed in the groove 144 so as to provide a seal between the base structure 15 and housing 11 when the mounting screw 141 and the other two mounting screws not shown in FIG. 4 are tightened. There is also an O-ring 145 annularly disposed in a grove 146 so as to provide a seal between the housing 11 and the shank portion of the draw bar 89.

There is a helical spring 147 disposed in a hole 148 in the cam follower member 22 and extending through a hole 149 in the base structure 15. The spring 147 is retained in compression in the holes 148 and 149 by the housing 11 so as to oppose the action of the wedge 127.

There is a space 150 which is the maximum amount of space between the draw bar 89 and the member 116 when the jaw members 38, 56 and 63 are open. There is an equivalent space 151 between the draw bar 89 and the pivot block 109 when the jaw members 38, 56 and 63 are closed. The function of the spaces 150 and 151 will be described in conjunction with an operational analysis of the chuck 10.

There is a hole 152 in the face portion 16 for receiving a pipe plug 152'. Lubrication for the chuck 10 is added through the hole 152.

It is to be pointed out that although the description provided supra involved mostly one cam follower member, cam, cam actuator arm, etc. for operating one jaw member, the other two jaw members have similar means cooperating therewith.

With the above description of components in mind, and by making reference to FIGS. 4 and 5, the following operational analysis will serve to convey the functional details of the chuck 10.

It can be seen that rotation or rocking of the cam 42 about the axis of the shaft 44 will cause the cam follower member 22 to move radially toward and away from the center of the base structure 15. Thus, the jaw member 38 mounted thereon, moves radially when the cam 42 is rotated. Similarly, the other two cam follower members 23 and 24 and their respective jaw members 56 and 63 move toward and away from the center of the base structure 15 when the cams associated therewith are rotated. Since the cams cooperating with the cam follower members 22, 23 and 24 are rotated by the cam actuator arms 51, 105 and 106 and the cam actuator arms are pivotally connected to the reciprocable pivot block 109, movement of the pivot block 109 in the cavity 114 by the draw bar 89 moves the jaw members 38, 56 and 63 equally toward and away from the center axis of the base structure 15.

Figure 6:
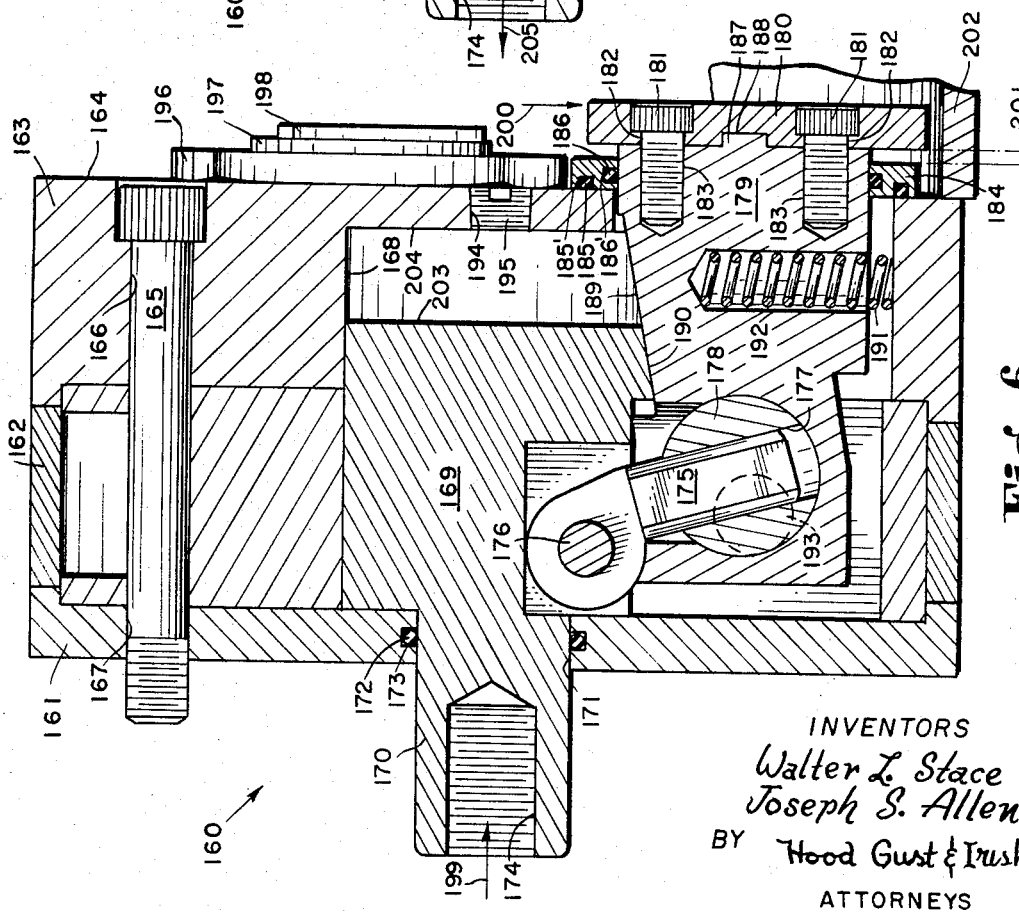
FIG. 6 is a side sectional view of another illustrative embodiment of the chuck of the present invention showing the position of the chuck elements when the jaw members are in their radially-inward positions.

Rotation or rocking of the cam 42 about the axis of the shaft 44 will also cause the cam follower member 22 to move axially in the direction of the arrow 154 and the arrow 155. Thus, the jaw member 38 and the other two cam follower members 23 and 24 and their respective jaw members 56 and 63 move in the direction of the arrows 154 and 155 when the cams associated therewith are rotated. The axial and radial movement of the jaw members 38, 56 and 63 operates to grip the work loaded into the chuck 10 and to pull it securely against the stop members 66, 67 and 68. The axial movement of the jaw members 38, 56 and 63 may be entirely in the direction of the face portion 16 when the jaw members are being engaged with work loaded into the chuck 10 or it may initially be away from the face portion 16 and back toward the face portion. The axial motion of the jaw members 38, 56 and 63 entirely toward the face portion 16 is obtained by having the starting point of the cams associated therewith arranged as shown in FIG. 4. That is, when the point on the surface of the cam 42 which is the maximum distance from the axis of the shaft 44 supporting the cam lies in a line extending through the axis of said shaft 44 and parallel to the center axis of the chuck 10 when the cam 42 is in its starting position, subsequent rotation of the cam 42 will move the jaw members 38 connected thereto toward the face portion 16. If the aforementioned point on the cam 42 is rotated through a line extending through the axis of the shaft 44 supporting the cam 42 and parallel to the axis of the chuck 10, the jaw member 38 will be moved away from and then toward the face portion 16. An embodiment wherein the jaw members are moved axially away from and then toward the front of the chuck is illustrated in FIGS. 6 and 7.

The three wedges 125, 126 and 127 are adapted to cooperate respectively with wedge surfaces on the cam follower members 22, 23 and 24 so as to pivot the cam follower members about their respective cams. The operation of the wedges 125, 126 and 127 can best be understood by analyzing the movement of the wedge 127 against a wedge surface 153 of the cam follower member 22 as shown in FIGS. 4 and 5.

When the jaw members 38, 56 and 63 are open, as shown in FIG. 4, the draw bar 89 and pivot block 109 must move in the direction of the arrow 154 in order to rotate the cam 42 and thereby move the cam follower member 22 to close the jaw member 38. It can be seen in FIG. 4 that when the draw bar 89 moves in the direction of the arrow 154, the space 150 is closed and the wedge 127 is forced radially outwardly against the wedge surface 153 of the cam follower member 22. The space 150 is shown closed in FIG. 5. The action of the wedge 127, therefore, tends to hold the cam follower member 22 in position against the spring 147 and any load applied to the jaw member 38 by the work loaded into the chuck 10. The locking force of the wedge 127 is developed by closing the space 150.

Referring now to FIG. 5, it can be seen that the initial movement of the draw bar 89 in the direction of the arrow 155 will close the space 151 to remove the locking force between the wedge 127 and the wedge surface 153 of the cam follower member 22. Subsequent movement of the draw bar 89 in the direction of the arrow 155 will open the jaw member 38.

An attractive feature of the chuck 10 is that movement of the wedge 127 on the wedge surface 153 as the pivot block 109 is reciprocated in the hole 114 tends to act in opposition to the spring 147 to keep the cam follower member 22 level, thereby assuring smooth and accurate movement of the jaw member 38. The smooth and accurate movement of all the jaw members 38, 56 and 63 permits more accurate gripping of the work loaded into the chuck 10.

Referring now to FIGS. 6 and 7, sectional views of a second embodiment of the present invention can be discussed.

The second embodiment, indicated generally by the reference number 160, is a chuck of the type which grips the work internally. That is, the jaw members of the chuck move radially outwardly to grip the work piece. As discussed in conjunction with the first embodiment of the present invention, the jaw members also are moved axially in order to grip the work piece and pull it towards the face of the chuck.

The chuck 160 is contained in a three-part housing consisting of the back portion 161, central portion 162 and face portion 163. The face portion 163 is provided with a face surface 164 which is the surface for receiving the work loaded into the chuck 160. The three portions of the housing are held together by means of mounting screws 165, only one of which is shown, which extend through countersunk holes 166 in the face portion of the housing and holes 167 in the back portion 161 of the housing.

The three portions 161, 162 and 163 of the housing form a cavity 168 for receiving a reciprocating means 169 therein. The reciprocating means 169 has a shank portion 170 extending axially through a hole 171 in the back portion 161 of the housing. There is an O-ring seal 172 located in a groove 173 in the hole 171 which provides a seal between the shank portion 170 and the back portion 161. The shank portion 170 is provided with a threaded hole 174 for receiving a means for moving the reciprocating means 169 in the cavity 168.

A cam actuator arm 175 is pivotally mounted on the reciprocating means 169 by means of the bearing pin 176 which is securely held in the reciprocating means. The cam actuator arm 175 extends into a hole 177 in a cam 178. The cam 178 is adapted to operate a cam follower member 179. A jaw member 180 is securely held to the cam follower member 179 by means of screws 181 which extend through the countersunk holes 182 in the jaw member 180 and into the threaded holes 183 in the cam follower member 179. The jaw member 180 is also secured to the cam follower member 179 by means of a key 187 which fits into a keyway 188 in the jaw member 180. A sealing ring 184 is disposed about the cam follower member 179 so as to prevent fluid leakage from the internal portion of the chuck 160 to the exterior.

There is an O-ring seal 185 disposed in a groove 185' in the sealing ring 184 which permits movement of the sealing ring 184 with respect to the face 164. There is another O-ring seal 186 disposed in a groove 186' in the sealing ring 184 which permits movement of the cam follower member 179 with respect to the sealing ring 184.

There is a wedge surface 189 on the cam follower member 179 which cooperates with a wedge surface 190 on the reciprocating means 169. The function of the wedge surfaces 189 and 190 will be discussed in an operational analysis of the chuck 160. There is a spring 191 disposed in a hole 192 to oppose the force created by the operation of the wedge surface 190 against the wedge surface 189.

It can be seen that the cam 178 is arranged so as to be rotated or rocked about a trunnion 193 by the pivoting action of the cam actuator arm 175. The rotation or rocking of the cam 178 causes the cam follower member 179 to be moved axially and radially as will be discussed in an operational analysis of the chuck 160.

There is a hole 194 in the center of the face portion 163 of the housing which permits lubrication to be added to the central portion of the chuck 160. There is a plug 195 which seals the hole 194.

It can be seen that there is another sealing ring 196 on the face 164 which provides a seal for a cam follower member 197. There is a key 198 shown on the cam follower member 197. A jaw member, similar to the jaw member 180, is mounted on the cam follower member 197 in a manner similar to that of the jaw member 180.

With the above description in mind, and by making reference to FIGS. 6 and 7, the following operational analysis will serve to convey the functional details of the chuck 160.

In FIG. 6 the jaw member 180 is shown in the radially inward position so as to be disengaged from the work piece indicated generally by the reference number 202. When the reciprocating means 169 is moved in the direction of the arrow 199, the cam follower member 179 and, consequently, the jaw member 180 are moved in the direction of the arrow 200 by the action of the wedge surface 190 against the wedge surface 189. Movement of the reciprocating means 169 in the direction of the arrow 199 also causes rotation of the cam 178 which moves the cam follower member 179. Initial movement of the reciprocating means 169 in the direction of the arrow 199 moves the cam follower member 179 in the direction of the arrow 199. Further movement of the reciprocating means 169 in the direction of the arrow 199 will move the cam follower member 179 in a direction opposite to the arrow 199. This inward and outward axial movement of the cam follower member 179 is evidenced by the opening and closing of the space indicated by the reference number 201 and is caused by the arrangement of the cam 178 on the trunnion 193. Specifically, when the point on the cam 178 which is at the maximum distance from the axis of the trunnion 193 moves through a line running from the axis of the trunnion 193 parallel to the axis of the chuck 160, the cam follower member 179 and the jaw member 180 attached thereto are moved to their maximum outward position.

By referring to FIG. 7 it can be seen that when the front surface 203 of the reciprocable actuating means 169 is against the back surface 204 of the face portion 163 of the housing, the jaw member 180 is held securely against the work piece 202 and the space 201 is closed so as to pull the work piece 202 against the face 164. To move the jaw member 180 out of engagement with the work piece 202, the reciprocable actuating means 169 is moved in the direction of the arrow 205 to permit the cam follower member 179 and, consequently, the jaw member 180 to move in the direction of the arrow 206.

The cooperation of the wedge surfaces 189 and 190 tends to rock the cam follower member 179 about the cam 178 in a clockwise direction as the reciprocating means 169 moves from the position shown in FIG. 6 to the position shown in FIG. 7 to thereby lock the jaw member 180 against the work 202.

The spring 191 is arranged to oppose the action of the wedge surface 190 against the wedge surface 189. Therefore, when the reciprocable actuating means 169 is moved in the direction of the arrow 205 to release the cam follower member 179, the spring 191 acts to return the cam follower member in the direction of the arrow 206.

Both of the embodiments discussed in this specification are arranged so that the jaw members are held against the work pieces loaded into the chuck by a wedging action against the cam follower members. This wedging action is sufficient to hold the jaw members in engagement with the work piece even after the actuating force applied to the reciprocating means or the reciprocable actuating means is removed. The reciprocable actuating means or the reciprocating means of the present invention may be operated by a fluid actuated plunger or by other mechanical means.

We claim as our invention:

1. A chuck including a base structure and a plurality of jaw members radially arranged about an axis of said base structure and adapted for radial movement relative to said axis, means for simultaneously operating all of said jaw members comprising cam follower means supporting each of said jaw members, cam means cooperating with each of said cam follower means, said cam means being rotatably supported in said base, linkage means for rotating said cam means, means disposed in said base structure for reciprocation substantially on said axis, said linkage means being pivotally connected to said reciprocating means, and wedge means for pivoting said cam follower means about said cam means so as to lock said jaw members in a closed position, said wedge means being disposed on said reciprocating means.

2. The chuck of claim 1 including resilient means for opposing the force applied by said wedge means against said cam follower means.

3. The chuck of claim 1 wherein said reciprocating means comprises a pivot block for said linkage means, a draw bar, and means connecting said draw bar to said pivot block so as to permit a predetermined relative movement therebetween, said wedge means being arranged to pivot said cam follower means about said cam means when said draw bar moves away from said pivot block and to release said cam follower means when said draw bar moves toward said pivot block.

4. The chuck of claim 1 wherein there is a movable sealing ring associated with each of said cam follower means so as to provide a seal between said base structure and said cam follower means.

5. The chuck of claim 1 wherein said linkage means extends into a hole provided in said cam means and slides in said hole when said cam means is rotated.

6. The chuck of claim 1 wherein each cam means is mounted on a trunnion extending transverse to said axis of said base structure, said cam means being arranged to rotate through an arc about said trunnion to initially move said jaw members away from said base structure and then toward said base structure when said jaw members are being engaged with work loaded into said chuck.

7. The chuck of claim 1 wherein each cam means is a cylindrically shaped drum eccentrically mounted on a trunnion extending parallel to the axis of said drum and transverse to said axis of said base structure, said drums being arranged so as to pull said jaw members in the direction of said base structure when said jaw members are being engaged with work loaded into said chuck.

8. The chuck of claim 1 wherein each cam means is a cylindrically shaped drum eccentrically mounted on a trunnion extending parallel to the axis of said drum and transverse to said axis of said base structure, said linkage means being cooperatively associated with said drums and said reciprocating means to rotate a point on each of said drums which is at the maximum distance from the axis of its associated trunnion through an axis of said cam follower means which extends through said axis of said trunnion and parallel to said axis of said base structure when said jaw members are being engaged with work loaded into said chuck.

9. A chuck comprising a base structure having a cavity opening through a back end of said base, a plurality of jaw members radially arranged on a front face portion of said base structure about the axis of said cavity and adapted for radial movement relative to said axis, cam follower means for supporting each of said jaw members, each of said cam follower means having a front end connected to its associated jaw member and a back end terminating in a wedge surface disposed adjacent to a cut-out in the wall of said cavity, cam means cooperating with each of said cam follower means, each of said cam means being rotatably supported in said base, linkage means for rotating said cam means, means disposed in said cavity for axial reciprocation therein, said linkage means being pivotally connected to said reciprocating means, said reciprocating means comprising a pivot block for said linkage means, a draw bar, means for connecting said draw bar to said pivot block so as to permit a predetermined relative axial movement therebetween, and wedge means for pivoting said cam follower means about said cam means so as to lock said jaw members in a closed position, said wedge means being carried by said reciprocating means so as to cooperate with said wedge surfaces on said cam follower means.

10. A chuck as in claim 9 wherein said wedge means is arranged so as to be forced against said wedge surface when said draw bar moves away from said pivot block and to release said wedge surface when said draw bar moves toward said pivot block.

11. A chuck as in claim 9 including a compression spring cooperatively associated with each of said cam follower means to oppose the action of said wedge means.

12. A chuck as in claim 9 including a housing disposed about said chuck so as to expose said face portion of said base structure, an O-ring seal between said housing and said face portion, an O-ring seal between said draw bar and said housing, and a sealing means between each of said cam follower means and said face portion, said housing being filled with a lubricating fluid for said chuck.

13. A chuck as in claim 9 wherein said draw bar has wedge surfaces integrally formed thereon for cooperating with said wedge means.

14. A chuck as in claim 9 including a sealing ring disposed about each cam follower means and resiliently held against said face portion of said chuck and an O-ring seal disposed between said cam follower means and said sealing ring.

15. A chuck comprising a base structure having a cavity opening through a back end of said base structure, a plurality of jaw members radially arranged on a front face portion of said base structure about the axis of said cavity and adapted for radial movement relative to said axis, cam follower means for supporting each of said jaw members, each of said cam follower means having a front end connected to its associated jaw member and a central portion forming a wedge surface disposed adjacent to a cut-out in the wall of said cavity, cam means cooperating with each of said cam follower means, each of said cam means being rotatably supported in said base structure, linkage means for rotating said cam means, means disposed in said cavity for axial reciprocation therein, said linkage means being pivotally connected to said reciprocating means, said reciprocating means having a wedge surface cooperating with each of said wedge surfaces on said cam follower means to move said jaw members into engagement with work loaded into said chuck, said wedge surfaces on said reciprocating means extending through said cut-outs in said wall of said cavity, and resilient means opposing the movement of said cam follower means by said reciprocating means.

16. The chuck of claim 15 wherein each cam means is a cylindrically shaped drum eccentrically mounted on a trunnion extending parallel to the axis of said drum and transverse to said axis of said cavity, said linkage means being cooperatively associated with said drums and said reciprocating means so as to rotate a point on each of said drums which is at the maximum distance from the axis of its associated trunnion through an axis of said cam follower means which extends through said axis of said trunnion and parallel to said axis of said cavity when said jaw members are being engaged with work loaded into said chuck.

References Cited
UNITED STATES PATENTS

| | | | |
|---|---|---|---|
| 2,617,657 | 11/1952 | Smith | 279—119 |
| 2,758,843 | 8/1956 | Coulson | 279—119 |
| 2,767,994 | 10/1956 | Gamet | 279—119 |

ROBERT C. RIORDON, *Primary Examiner.*

J. PETERS, *Assistant Examiner.*